United States Patent
Jamison et al.

(10) Patent No.: US 8,925,978 B2
(45) Date of Patent: Jan. 6, 2015

(54) COUPLING AND JOINT FOR FIXEDLY AND SEALINGLY SECURING COMPONENTS TO ONE ANOTHER

(71) Applicants: Tommy L. Jamison, Hernando, MS (US); Kevin Neil Young, Arlington, TN (US); Robert McKenzie, Munford, TN (US); Marcus Robert Elmer, Cordova, TN (US)

(72) Inventors: Tommy L. Jamison, Hernando, MS (US); Kevin Neil Young, Arlington, TN (US); Robert McKenzie, Munford, TN (US); Marcus Robert Elmer, Cordova, TN (US)

(73) Assignee: Mueller Industries, Inc., Memphis, TN (US)

(*) Notice: Subject to any disclaimer, the term of this patent is extended or adjusted under 35 U.S.C. 154(b) by 16 days.

(21) Appl. No.: 13/732,715

(22) Filed: Jan. 2, 2013

(65) Prior Publication Data
US 2013/0119655 A1    May 16, 2013

Related U.S. Application Data

(63) Continuation-in-part of application No. 13/531,014, filed on Jun. 22, 2012, and a continuation-in-part of application No. 12/183,761, filed on Jul. 31, 2008, now abandoned.

(60) Provisional application No. 61/500,907, filed on Jun. 24, 2011.

(51) Int. Cl.
*F16L 13/14*    (2006.01)
*F16L 17/02*    (2006.01)
*F16L 37/091*   (2006.01)

(52) U.S. Cl.
CPC ............... *F16L 17/02* (2013.01); *F16L 37/091* (2013.01)
USPC ....................... 285/382.2; 285/382

(58) Field of Classification Search
USPC .......................... 285/382, 382.1, 382.2, 382.4
See application file for complete search history.

(56) References Cited

U.S. PATENT DOCUMENTS 547,400 A * 10/1895 Palmiter .......................... 29/523
1,179,853 A *  4/1916 McCulloch .................... 403/274

(Continued)

FOREIGN PATENT DOCUMENTS

AU      281980 A    6/1963
AU      627018 B2   8/1992

(Continued)

OTHER PUBLICATIONS

Kitec: Best of Borth Worlds! IPEK Inc. Copyright 2000.

(Continued)

*Primary Examiner* — Aaron Dunwoody
(74) *Attorney, Agent, or Firm* — Harness, Dickey & Pierce, P.L.C.

(57) ABSTRACT

An assembly may include a fitting, a first pipe, and a first seal. The fitting may include an annular body having a first insertion end and an inner diametrical surface having a first knurled portion disposed adjacent the first insertion end. The first pipe may include a first end portion that is received into the first insertion end of the body and an outer diametrical surface including knurls formed thereon. The knurls of the outer diametrical surface may engage the first knurled portion of the fitting. The first seal element may be disposed within the fitting and may sealingly engage the first pipe and the fitting body. The engagement between the inner diametrical surface of the fitting and the outer diametrical surface of the pipe may a press fit and/or an interference fit.

8 Claims, 9 Drawing Sheets

(56) References Cited

U.S. PATENT DOCUMENTS

| | | | |
|---|---|---|---|
| 1,292,072 A | | 1/1919 | Rooney |
| 1,677,865 A | | 7/1928 | Kroeger |
| 1,911,755 A | | 5/1933 | Grover |
| 2,008,534 A | | 7/1935 | Wiltse |
| 2,120,067 A | | 6/1938 | Gray et al. |
| 2,192,914 A | | 3/1940 | Ice |
| 2,329,000 A | | 9/1943 | Rembert |
| 2,346,051 A | | 4/1944 | Seamark |
| 2,429,076 A | * | 10/1947 | Sery ............................ 285/382.4 |
| 2,901,269 A | | 8/1959 | Rikard |
| 2,998,269 A | | 8/1961 | Houghton |
| 3,068,563 A | * | 12/1962 | Reverman ........................ 29/458 |
| 3,149,861 A | | 9/1964 | Larsson |
| 3,188,733 A | * | 6/1965 | Rickard ............................ 29/523 |
| 3,222,094 A | | 12/1965 | Hill et al. |
| 3,244,441 A | | 4/1966 | Caudle |
| 3,343,252 A | * | 9/1967 | Reesor ............................ 29/458 |
| 3,363,680 A | | 1/1968 | Baker |
| 3,434,900 A | | 3/1969 | Bender |
| 3,572,779 A | * | 3/1971 | Dawson ........................ 285/382.2 |
| 3,579,794 A | | 5/1971 | Powell |
| 3,596,939 A | * | 8/1971 | Gibson ........................... 285/382.2 |
| 3,673,029 A | | 6/1972 | McLarty |
| 3,675,949 A | * | 7/1972 | Dawson ........................... 285/354 |
| 3,689,111 A | * | 9/1972 | Osmun et al. .................... 285/39 |
| 3,689,112 A | * | 9/1972 | Slator et al. ...................... 285/39 |
| 3,762,059 A | * | 10/1973 | Dawson ............................ 33/541 |
| RE28,457 E | * | 7/1975 | Dawson ........................... 285/354 |
| 3,916,502 A | | 11/1975 | Bagnulo |
| 3,960,394 A | | 6/1976 | Hubner et al. |
| 4,042,262 A | * | 8/1977 | Mooney et al. .................. 285/98 |
| 4,130,302 A | | 12/1978 | Mitchell et al. |
| 4,153,656 A | | 5/1979 | Bunyan |
| 4,328,982 A | * | 5/1982 | Christianson ................. 285/351 |
| 4,328,983 A | * | 5/1982 | Gibson ........................... 285/382 |
| 4,393,566 A | | 7/1983 | Uhlmann et al. |
| 4,541,655 A | | 9/1985 | Hunter |
| 4,548,430 A | | 10/1985 | Haubert et al. |
| 4,647,080 A | | 3/1987 | Sandt et al. |
| 4,715,624 A | | 12/1987 | Frye |
| 4,726,612 A | | 2/1988 | Picton |
| 4,831,824 A | * | 5/1989 | Fukazawa ........................ 60/322 |
| 4,850,621 A | | 7/1989 | Umehara |
| 4,850,641 A | | 7/1989 | Walker |
| 4,905,766 A | * | 3/1990 | Dietz et al. ....................... 169/91 |
| 5,044,671 A | | 9/1991 | Chisnell et al. |
| 5,067,751 A | | 11/1991 | Walworth et al. |
| 5,080,406 A | * | 1/1992 | Hyatt et al. ...................... 285/330 |
| 5,150,519 A | | 9/1992 | Unewisse et al. |
| 5,168,618 A | | 12/1992 | Unewisse et al. |
| 5,246,256 A | * | 9/1993 | Rung et al. ....................... 285/55 |
| 5,301,877 A | * | 4/1994 | Madison ........................ 239/154 |
| 5,378,023 A | | 1/1995 | Olbrich |
| 5,478,123 A | | 12/1995 | Kanao |
| 5,484,174 A | | 1/1996 | Gotoh et al. |
| 5,486,024 A | | 1/1996 | Dierdorf |
| 5,487,406 A | | 1/1996 | Jirasek |
| 5,507,528 A | * | 4/1996 | Mastrosimone ................ 285/22 |
| 5,560,661 A | * | 10/1996 | Babel et al. ..................... 285/382 |
| 5,597,186 A | * | 1/1997 | Ridenour et al. .............. 285/330 |
| 5,651,173 A | | 7/1997 | Roy et al. |
| 5,685,577 A | | 11/1997 | Vanesky |
| 5,709,417 A | * | 1/1998 | Verbeck ........................ 285/382 |
| 5,829,795 A | | 11/1998 | Riesselmann |
| 5,832,588 A | | 11/1998 | Ridenour et al. |
| 5,833,280 A | * | 11/1998 | Ferlin et al. ..................... 285/330 |
| 5,851,036 A | | 12/1998 | Vanesky |
| 5,887,909 A | | 3/1999 | Tokuda |
| 5,890,287 A | | 4/1999 | Fukaya |
| 5,944,359 A | | 8/1999 | Andronaco |
| 6,059,338 A | | 5/2000 | Diederichs et al. |
| 6,082,784 A | | 7/2000 | Fukaya |
| 6,099,045 A | | 8/2000 | Pirona |
| 6,145,892 A | | 11/2000 | Weber |
| 6,202,284 B1 | | 3/2001 | Joblin |
| 6,241,290 B1 | | 6/2001 | Foering et al. |
| 6,260,891 B1 | | 7/2001 | Foering et al. |
| 6,427,309 B1 | | 8/2002 | Viegener et al. |
| 6,477,757 B2 | | 11/2002 | Viegener et al. |
| 6,581,983 B1 | | 6/2003 | Viegener et al. |
| 6,619,701 B1 | * | 9/2003 | Udhofer ........................ 285/382.2 |
| 6,726,256 B2 | | 4/2004 | Viegener et al. |
| 6,746,055 B1 | * | 6/2004 | Wood et al. ................... 285/249 |
| 6,994,381 B1 | | 2/2006 | Shade et al. |
| 7,014,219 B2 | | 3/2006 | Hoppenz et al. |
| 7,237,809 B2 | | 7/2007 | Connell |
| 7,341,285 B2 | | 3/2008 | McPherson |
| 7,484,772 B2 | | 2/2009 | Thorensen |
| 7,954,861 B2 | * | 6/2011 | Swift et al. .................. 285/382.2 |
| 8,083,268 B2 | | 12/2011 | Jamison et al. |
| 8,118,331 B2 | * | 2/2012 | Yamashita et al. ............ 285/256 |
| 2006/0138772 A1 | | 6/2006 | Galante et al. |
| 2007/0090641 A1 | | 4/2007 | Jamison et al. |
| 2007/0176424 A1 | * | 8/2007 | Nobileau ........................ 285/382 |
| 2008/0048448 A1 | * | 2/2008 | Jamison et al. ............. 285/382.2 |
| 2012/0161438 A1 | * | 6/2012 | Rischen et al. ............... 285/382 |
| 2012/0169047 A1 | * | 7/2012 | Arn et al. ..................... 285/382.4 |

FOREIGN PATENT DOCUMENTS

| | | | |
|---|---|---|---|
| CH | 648643 | A5 | 3/1985 |
| CH | 682942 | A5 | 12/1993 |
| DE | 1229351 | B | 11/1966 |
| DE | 7406802 | U | 10/1991 |
| DE | 9113050 | U1 | 12/1991 |
| EP | 0356719 | A1 | 3/1990 |
| EP | 0448921 | A1 | 10/1991 |
| EP | 530404 | A1 | 3/1993 |
| FR | 2321654 | A1 | 3/1977 |
| GB | 1293371 | A | 10/1972 |
| GB | 1511540 | A | 5/1978 |
| NZ | 220507 | A | 4/1990 |
| NZ | 322190 | A | 1/2000 |
| WO | 0175349 | A1 | 10/2001 |
| WO | 2005017006 | A1 | 2/2005 |

OTHER PUBLICATIONS

Turn Off Your Torch, Ridgid Tool Company. Copyright 1999.
Hungarian Intellectual Property Office Written Opinon for Singapore Patent Application No. 200904767-1; mailed by Singapore Patent Office on Aug. 15, 2011.
Australian Patent Office Search Report for Singapore Patent Application No. 2009/04767-1, Filing Date Jul. 14, 2009; Report mailed Oct. 19, 2009.
New Zealand Patent Office Examination Report, App. No. NZ 578340, Filing Date Jul. 10, 2009; Report dated Jul. 16, 2009.
Australian Patent Office Search Report, App. No. AU 2009/203089, Filing Date Jul. 30, 2009; Report dated Oct. 12, 2010.
Canadian Patent Office Examination Report, App. No. CA 2671012, Filing Date Jul. 7, 2009; Report dated Oct. 18, 2010.
Deutsche Alwa BmbH "Cufix Manschetten Preβfittings," Sep. 1993 pp. 11-14.
The American Society of Mechanical Engineers, Wrought Copper and Copper Alloy Solder Joint Pressure Fittings, ASME B16.22-2001 (Revision of ASME B16.22-1995; Reaffirmed 2010).
European Search Report regarding Application No. 06255386, dated Apr. 27, 2007.
CopperBond. The Noble Company, Copyright 2001. Web. Feb. 14, 2006. http://www.noblecompany.com/copper.html.
Just for Copper—The New & Reliable Way to Plumb With Copper. Jackson Industries, Copyright 2004. Web. Feb. 14, 2006. http://www.justforcopper.com/JFCDiyer.htm.

* cited by examiner

COUPLING AND JOINT FOR FIXEDLY AND SEALINGLY SECURING COMPONENTS TO ONE ANOTHER

CROSS-REFERENCE TO RELATED APPLICATIONS

This application is a continuation-in-part of U.S. patent application Ser. No. 12/183,761 filed on Jul. 31, 2008 and a continuation-in-part of U.S. patent application Ser. No. 13/531,014 filed on Jun. 22, 2012 which claims the benefit of U.S. Provisional Patent Application No. 61/500,907 filed Jun. 24, 2011. The entire disclosures of each of the above applications are incorporated herein by reference.

FIELD

The present disclosure generally relates to fluid conduit systems that may be employed, for example, for routing and delivering potable water, gases or chemicals.

BACKGROUND

This section provides background information related to the present disclosure and is not necessarily prior art.

There has long been a need for joining two components in a manner that fixedly and sealingly couples the components to one another. One extremely common application concerns the coupling of copper tubing that is commonly employed to transmit potable water in a building.

One system for joining components is disclosed in U.S. Pat. No. 7,316,429, which discloses connection piece having a sealing ring, a cutting ring and a T-shaped separating ring that spaces the sealing ring apart from the cutting ring. This system can be relatively expensive and as such, there remains a need in the art for an improved joining system.

SUMMARY

This section provides a general summary of the disclosure, and is not a comprehensive disclosure of its full scope or all of its features.

In one form, the present disclosure provides an assembly that may include a fitting, a structure and a seal element. The fitting may include an annular body having an insertion end and an inner diametrical surface having gripping features formed thereon. The structure may include an end that is received into the insertion end of the body and an outer diametrical surface engaging the inner diametrical surface of the fitting. The seal element may be disposed within the fitting and sealingly engaged to the structure and the fitting body. The engagement between the inner diametrical surface of the fitting and the outer diametrical surface of the structure may include a press fit and/or an interference fit.

In another form, the present disclosure provides an assembly that may include a fitting, a structure and a seal element. The fitting may include an annular body having an insertion end and an inner diametrical surface. The structure may include an end that is received into the insertion end of the body and an outer diametrical surface engaging the inner diametrical surface of the fitting. The outer diametrical surface may include gripping features formed thereon. The seal element may be disposed within the fitting and sealingly engaged to the structure and the fitting body. The engagement between the inner diametrical surface of the fitting and the outer diametrical surface of the structure may include a press fit and/or an interference fit.

In another form the present disclosure provides an assembly that may include a fitting, a first pipe, and a first seal. The fitting may include an annular body having a first insertion end and an inner diametrical surface having a first knurled portion disposed adjacent the first insertion end. The first pipe may include a first end portion that is received into the first insertion end of the body and an outer diametrical surface including knurls formed thereon. The knurls of the outer diametrical surface may engage the first knurled portion of the fitting. The first seal element may be disposed within the fitting and may sealingly engage the first pipe and the fitting body. The engagement between the inner diametrical surface of the fitting and the outer diametrical surface of the pipe may include a press fit and/or an interference fit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
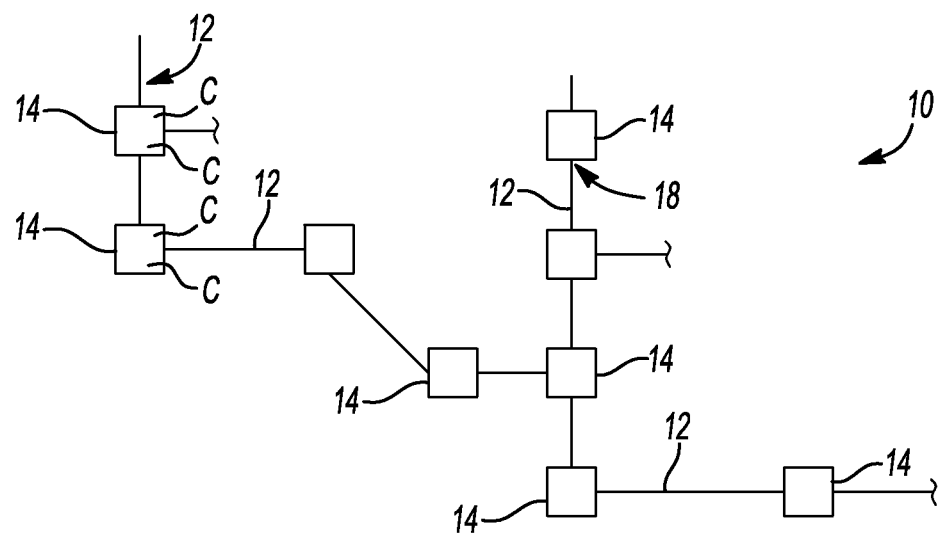
FIG. 1 is a schematic illustration of an exemplary assembly constructed in accordance with the teachings of the present disclosure.

With reference to FIG. 1 of the drawings, an assembly constructed in accordance with the teachings of the present invention is generally indicated by reference numeral 10. With additional reference to FIGS. 2 and 3, the assembly 10 can include a component or structure 12 and a fitting 14. In the particular example illustrated, the assembly 10 is suited for use in communicating (i.e., supplying, delivering, routing) a fluid, such as a gas or liquid and as such, the structure 12 is illustrated to be a length of tubing. More particularly, the structure 12 in the particular embodiment illustrated is a length of drawn (full hard) copper tubing that is suitable for use in a system for the transmission of potable water. It will be appreciated, however, that the teachings of the present invention have broader applicability and as such, the scope of the present disclosure (and appended claims) is not limited to the particular application of the invention described and illustrated herein but rather extends to any joint wherein the components of the joint are fixedly and sealingly joined in the manner disclosed herein. In this regard, it will be appreciated that the structure 12 need not be a tubular structure but rather could be any structure, such as a shaft, that sufficiently corresponds in size and shape to the fitting 14 so that a sealed or fluid-tight joint or connection may be formed therebetween.

Figure 2:
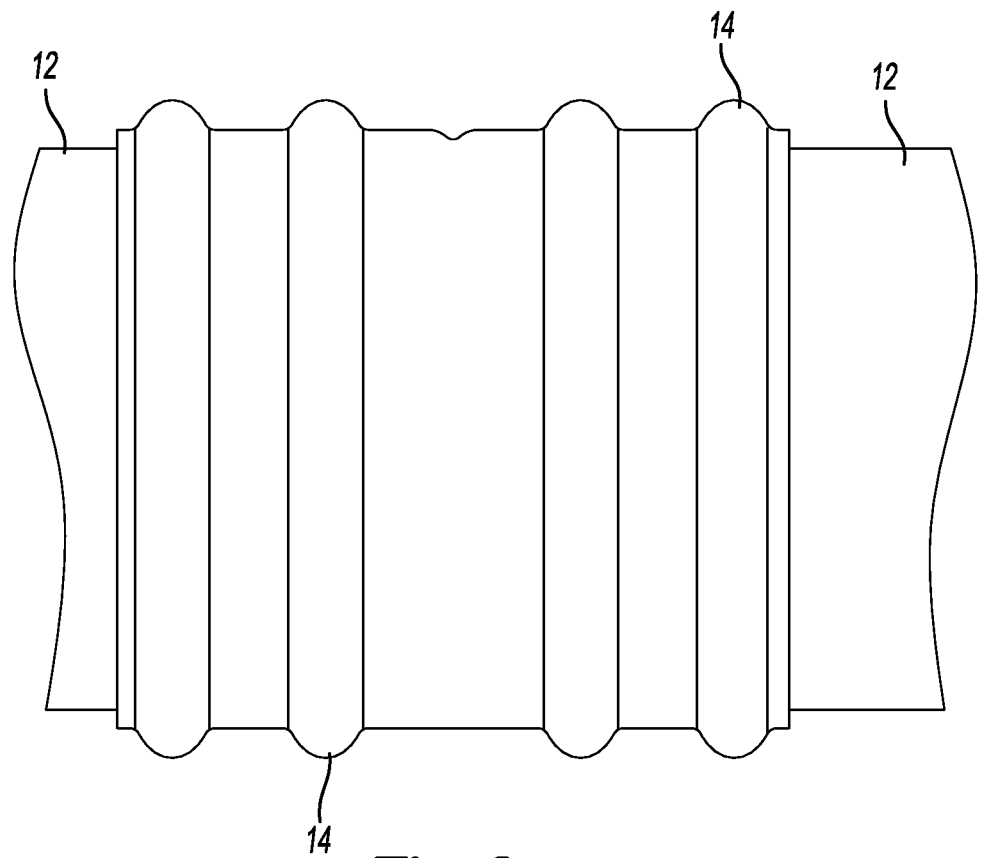
FIG. 2 is a side elevation view of a portion of the assembly of FIG. 1.
Figure 3:
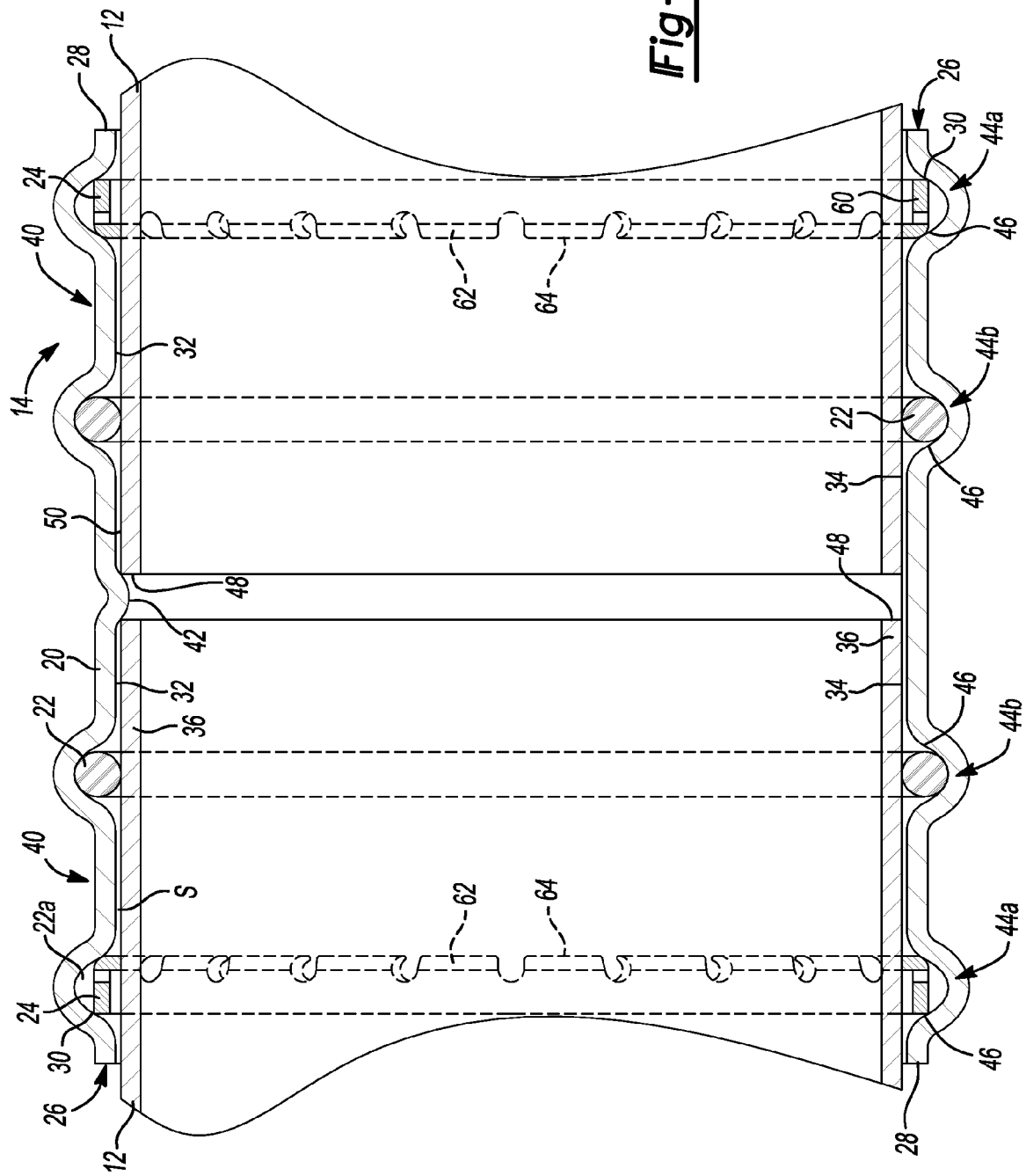
FIG. 3 is a longitudinal section view of the portion of the assembly that is illustrated in FIG. 2.

In FIGS. 2 and 3, the fitting 14 can include a body 20, a seal element 22 and a grip ring 24. It will be appreciated that although the particular fitting illustrated is a straight union, the teachings of the present invention have applicability to various other types of fittings, including elbows, tees, caps, adapters, reducers, bushings, etc.

The body 20 can be made from any structural but ductile material, such as copper, brass, bronze, stainless steel or another metal. In the example provided, the body 20 is made of a copper alloy so as to eliminate the potential for a galvanic reaction with the copper alloy of the structure 12. The body 20 can include a hollow insertion end 26 that can have an end face 28, an abutting wall 30 and an interior surface 32. A cavity 34 defined by insertion end 26 can be configured to receive an associated end 36 of the structure 12.

Optionally, the body 20 can include a mount 40 and a stop 42. The mount 40 can be configured to hold and position the seal element 22 and/or the grip ring 24, while the stop 42 can be a feature that inhibits the insertion of the structure 12 into the cavity 34 beyond a predetermined distance. For example, the mount 40 can define a pair of annular cavities 44a, 44b having a semi-toric inner surface 46 and the stop 42 can comprise a necked down area and/or one or more dimples and/or an annular roll (formed in the body 20) that can extend into the cavity 34 such that an axial end face 48 of the end 36 of the structure 12 can contact the stop 42 to limit an amount by which the end 36 is inserted into the body 20.

The seal element 22 can be any type of seal that is configured to sealingly engage the interior surface 32 of the insertion end 26 and an exterior surface 50 of the end 36 of the structure 12. In the particular example provided, the seal element 22 comprises an O-ring that is received in the annular cavity 44b and is sized to sealingly engage the interior and exterior surfaces 32 and 50 upon insertion of the end 36 of the structure 12 into the insertion end 26 of the body 20 and through the seal element 22. It will be appreciated, however, that the seal element 22 could be configured to sealingly engage the interior surface 32 and/or the exterior surface 50 only after the body 20 has been secured to the structure 12 to inhibit axial movement of the fitting 14 relative to the structure 12.

Figure 4:
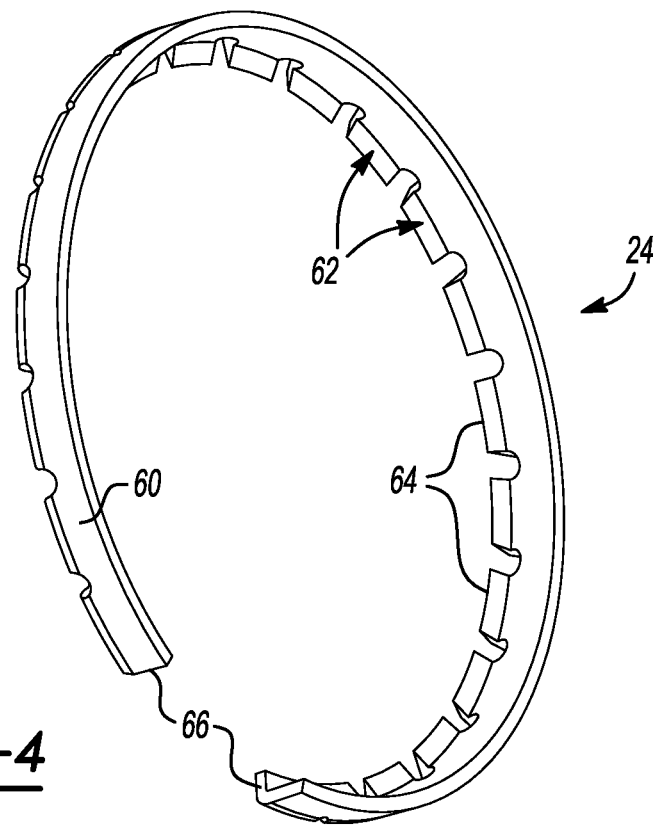
FIG. 4 is a perspective view of a portion of the assembly of FIG. 1, illustrating the grip ring in more detail.

With reference to FIGS. 3 and 4, the grip ring 24 can be configured to permit the end 36 of the structure 12 to be inserted into the insertion end 26 but resist withdrawal of the end 36 of the structure 12 from the insertion end 26. The grip ring 24 can have a ring body 60 and a plurality of gripping elements 62 that can be coupled to the ring body 60. In the particular example provided, the ring body 60 defines a circumferentially extending structure that is abutted against the abutting wall 30, while the gripping elements 62 comprise circumferentially spaced-apart teeth 64 that are resiliently coupled to a proximal end of the ring body 60. The teeth 64 can extend from the ring body 60 in direction that is radially-inward and axially away from the proximal end 36 of the ring body 60. The grip ring 24 can be received in the cavity 34 in the insertion end 26 and can be coupled to the body 20 in a manner that limits movement of the grip ring 24 in an axial direction relative to the body 20 (e.g., such that movement of the grip ring 24 in a direction that would withdraw the grip ring 24 from the insertion end 26 causes the grip ring 24 to contact the abutting wall 30). In the example provided, the grip ring 24 is received in the annular cavity 44a in the mount 40 such that grip ring 24 impinges on the semi-toric inner surface 46 to thereby limit axial movement of the grip ring 24.

In the example provided, the grip ring 24 has open ends 66, which permits the grip ring 24 to be inserted into the annular cavity 44a after the body 20 of the fitting 14 has been formed. It will be appreciated, however, that the grip ring 24 can be formed in an endless manner and that in such case, it may be desirable to install the grip ring 24 into the fitting 14 prior to the formation of the abutting wall 30.

Returning to FIGS. 1 and 3, the fitting 14 can be coupled to the structure 12 by inserting the end 36 of the structure 12 into the insertion end 26 and forcing the end 36 axially through the grip ring 24 and the seal element 22. The seal element 22 may be configured such that it does not sealingly engage one or both of the interior surface 32 of the insertion end 26 (i.e., the semi-toric inner surface 46 in the particular example provided) and the exterior surface 50 of the end 36 of the structure 12. In the particular example provided, however, the seal element 22 sealingly engages both the interior surface 32 of the insertion end 26 (i.e., the semi-toric inner surface 46 in the particular example provided) and the exterior surface 50 of the end 36 of the structure 12 when the end 36 of the structure 12 is inserted through the seal element 22. It will be appreciated that the grip ring 24 is configured to inhibit axial withdrawal of the end 36 of the structure 12 from the insertion end 26. A commercially-available crimping tool (not shown), such as CT400 crimp tool marketed by Rigid or an M20+ crimp tool marketed by Stanley Bostitch, can be employed to deform the insertion end 26 of the fitting 14 (schematically indicated by reference letter C in FIG. 1) to substantially permanently couple the fitting 14 to the structure 12. Additionally or alternatively, insertion end 26 of the fitting 14 could be deformed by the commercially available crimping tool to create or improve sealing engagement of the seal element 22 with the interior surface 32 of the insertion end 26 (i.e., the semi-toric inner surface 46 in the particular example provided) and/or the exterior surface 50 of the end 36 of the structure 12.

While the grip ring 24 has been illustrated and described as being axially closer to the end face 28 of the insertion end 26, it will be appreciated that the positions of the grip ring 24 and the seal element 22 could be reversed. It will also be appreciated that the spacing between the seal element 22 and the grip ring 24 can be sized in a desired manner (e.g., to accommodate the jaws of the commercially-available crimp tool mentioned above) and that multiple seal elements 22 and/or grip rings 24 could be employed if desired.

Figure 5:
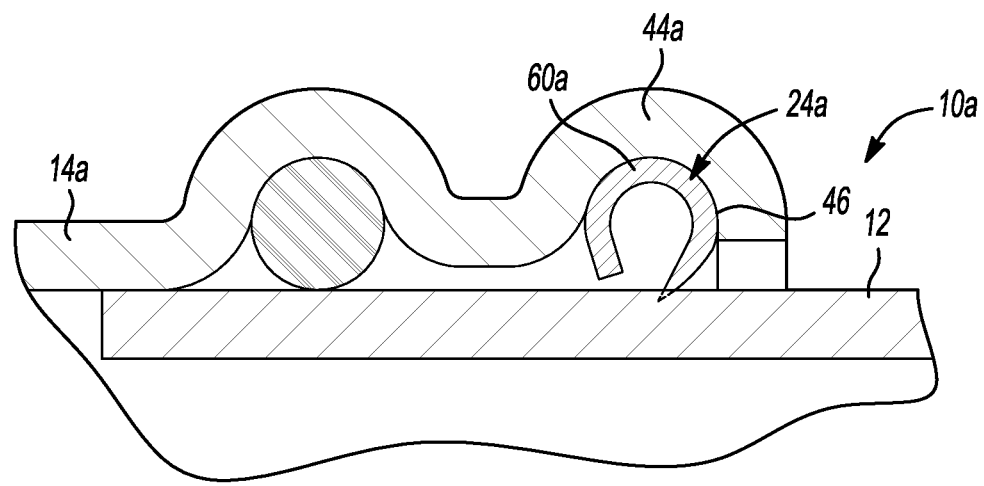
FIG. 5 is a longitudinal section view of a portion of a second assembly constructed in accordance with the teachings of the present disclosure.

While the grip ring 24 has been illustrated in the above-example as comprising a ring body 60 having a generally rectangular cross-sectional shape, it will be appreciated that the ring body 60 could be formed differently. With reference to FIG. 5, a portion of another assembly constructed in accordance with the teachings of the present disclosure is generally indicated by reference numeral 10a. The assembly 10a can be generally similar to the assembly 10 of FIG. 1 except that the grip ring 24a has a ring body 60a having a cross-sectional shape that is defined by at least one radius such that the ring body 60a of the grip ring 24a is able to pivot on the semi-toric inner surface 46 of the annular cavity 44a more easily than the grip ring 24 that is depicted in FIGS. 3 and 4. Stated another way, the ring body 60a has an exterior surface that is shaped in a complementary manner to the semi-toric interior surface 46 of the annular cavity 44a. Relative to the configuration illustrated in FIGS. 3 and 4, the configuration of the grip ring 24a in this manner may reduce the force that is needed to insert the structure through the grip ring and/or may increase the retention force of the grip ring 24a (i.e., the force needed to pull the structure 12 from the fitting 14a once the structure 12 has been fully inserted into the insertion end 26a of the fitting 14a).

Figure 6:
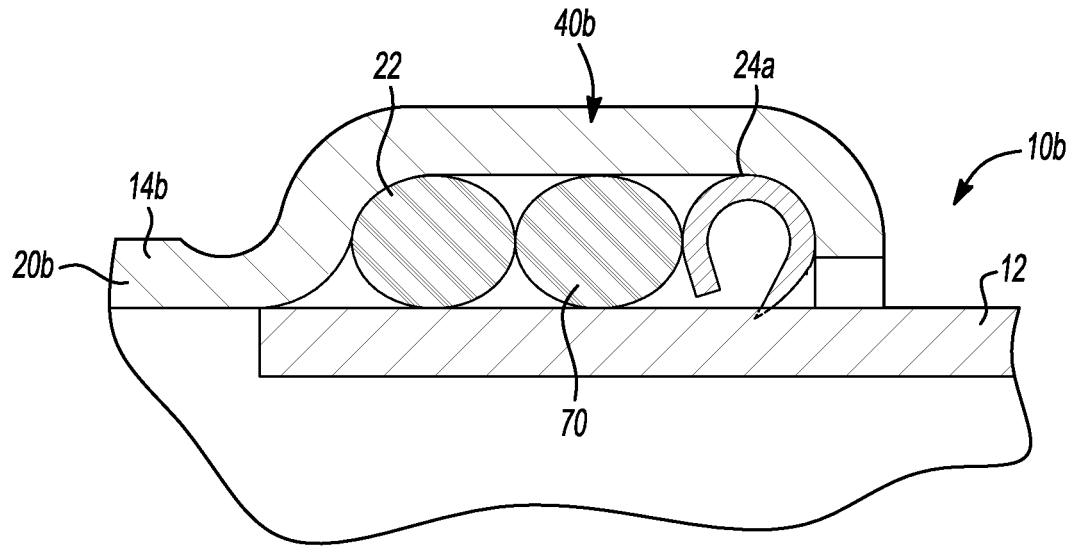
FIG. 6 is a longitudinal section view of a portion of a third assembly constructed in accordance with the teachings of the present disclosure.

In FIG. 6, a portion of a third assembly constructed in accordance with the teachings of the present disclosure is generally indicted by reference numeral 10b. The assembly 10b can include the structure 12 and a fitting 14b, which can be generally similar to the fitting 14 (FIG. 2) except as detailed herein. In this example, the mount 40b of the insertion end 26b can be sized to receive the seal element 22, a spacing element 70, and the grip ring 24a. While the grip ring 24 is depicted in FIG. 6 as being similar to the grip ring employed in FIG. 5, it will be appreciated that the grip ring depicted in FIG. 4 could be employed in the alternative. The spacing element 70 can be any type of structure that is configured to axially space the seal element 22 apart from the grip ring 24a and need not be configured to form a seal. In the particular example provided however, the spacing element 70 is a seal that is configured to sealingly engage against the body 20b and the structure 12. Any type of seal may be employed for the spacing element 70, but in the example provided, the spacing element 70 is an O-ring that is identical to that which is employed for the seal element 22. It will be appreciated, however, that if a seal is employed as the spacing element 70, the seal need not be identical to that which is employed for the seal element 22.

In situations where a seal is employed for the spacing element 70, those of skill in the art will appreciate that the spacing element 70 is a secondary seal (whereas the seal element 22 is a primary seal).

Figure 7:
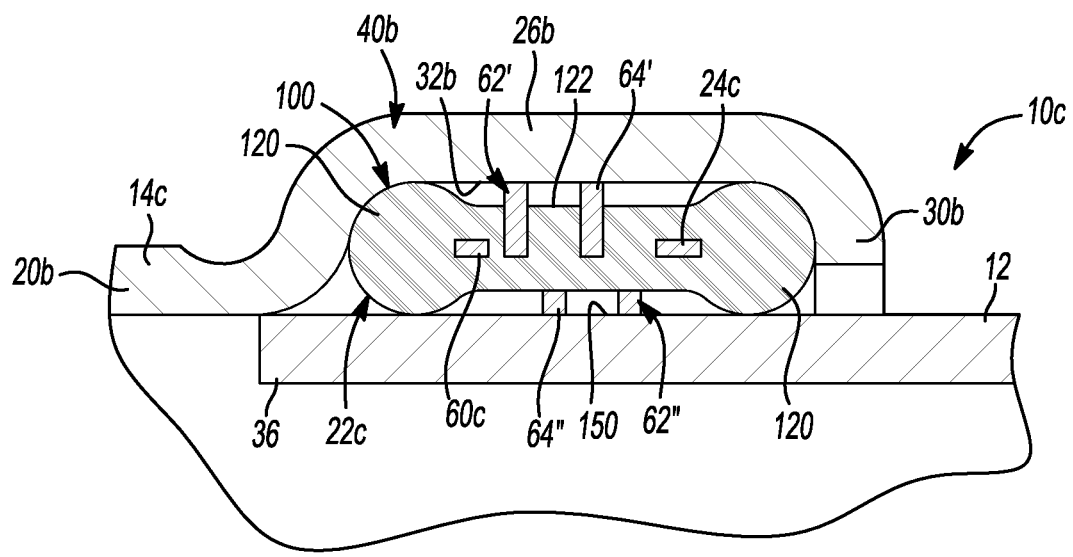
FIG. 7 is a longitudinal section view of a portion of a fourth assembly constructed in accordance with the teachings of the present disclosure.

In the example of FIG. 7, a portion of a fourth assembly constructed in accordance with the teachings of the present disclosure is generally indicted by reference numeral 10c. The assembly 10c can include a fitting 14c that is similar to the fitting 14b of FIG. 6 except as described herein. In this example, a seal and gripping assembly 100 is employed in the mount 40b in the insertion end 26b of the body 20b. The seal and gripping assembly 100 can comprise a sealing element 22c and a grip ring 24c.

The grip ring 24c can have a ring body 60c, a first set of gripping elements 62' and a second set of gripping elements 62". The ring body 60c can be a circumferentially extending structure to which the first and second sets of gripping elements 62' and 62" can be coupled. The first set of gripping elements 62' can comprise first teeth 64' that can extend in a first direction that is radially outwardly from the ring body 60c and axially toward the abutting wall 30b, while the second set of gripping elements 62" can comprise second teeth 64" that can extend in a second direction that can be radially inwardly from the ring body 60c and axially away from the abutting wall 30b. The first teeth 64 can be disposed in one or more rows (two rows are employed in the particular example illustrated) and can be configured to engage the interior surface 32b of the insertion end 26b to inhibit axial movement of the grip ring 24c in a direction that would tend to withdraw the grip ring 24c directly from the insertion end 26c. The second teeth 64 can be disposed in one or more rows (two rows are employed in the particular example illustrated) and can be configured to engage the exterior surface 50 of the end 36 of the structure 12 to inhibit axial movement of the grip ring 24c in a direction that would permit the grip ring 24c from being withdrawn from the end 36 of the structure 12. The grip ring 24c can be unitarily formed as a continuous annular structure (i.e., in an endless manner). In the particular example provided, however, the grip ring 24c is formed in a discontinuous manner from sheet stock (e.g., carbon steel sheet metal, stainless steel sheet metal) through a progressive die, fourslide or multi-slide. If desired, the ends of the sheet stock material may be joined together in an appropriate manner, such as welding. The grip ring 24c can be subjected to secondary processes, such as plating or heat treating, if desired.

The seal element 22c can be coupled to the grip ring 24c in any desired manner. In the particular example provided, the seal element 22c is formed from an elastomeric material that is overmolded to the grip ring 24c such that the seal element 22c is cohesively bonded to the grip ring 24c. The seal element 22c can define one or more seal members 120 that can be coupled directly to the grip ring 24c. If desired, the seal element 22c can also comprise one or more link members 122 that can aid in orienting and/or retaining the seal members 120.

It will be appreciated from this disclosure that the differently facing first and second teeth 64' and 64" permit the grip ring 24c to grip to both the body 20b of the fitting 14b and the end 36 of the structure 12. It will also be appreciated that it may be desirable to insert the seal and gripping assembly 100 prior to the formation of the abutting wall 30b.

Figure 8:
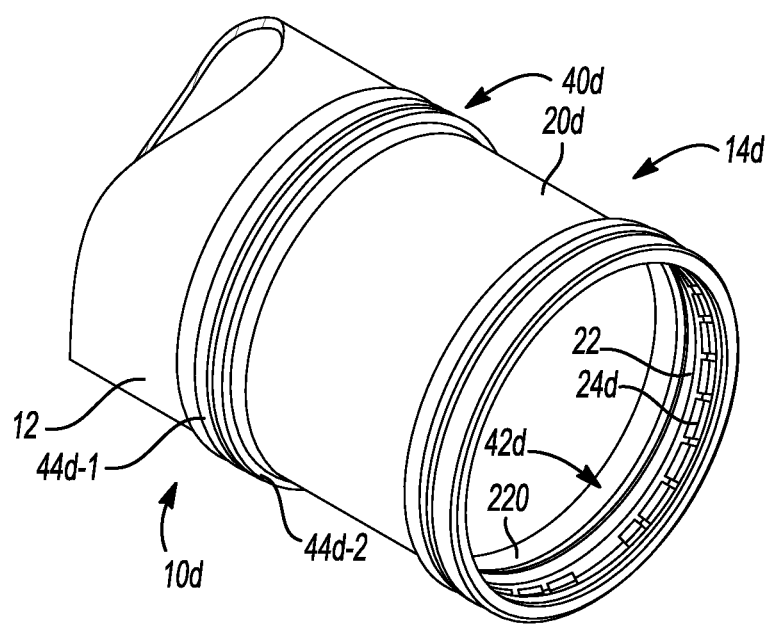
FIG. 8 is a perspective view of a portion of a fifth assembly constructed in accordance with the teachings of the present disclosure.
Figure 9:
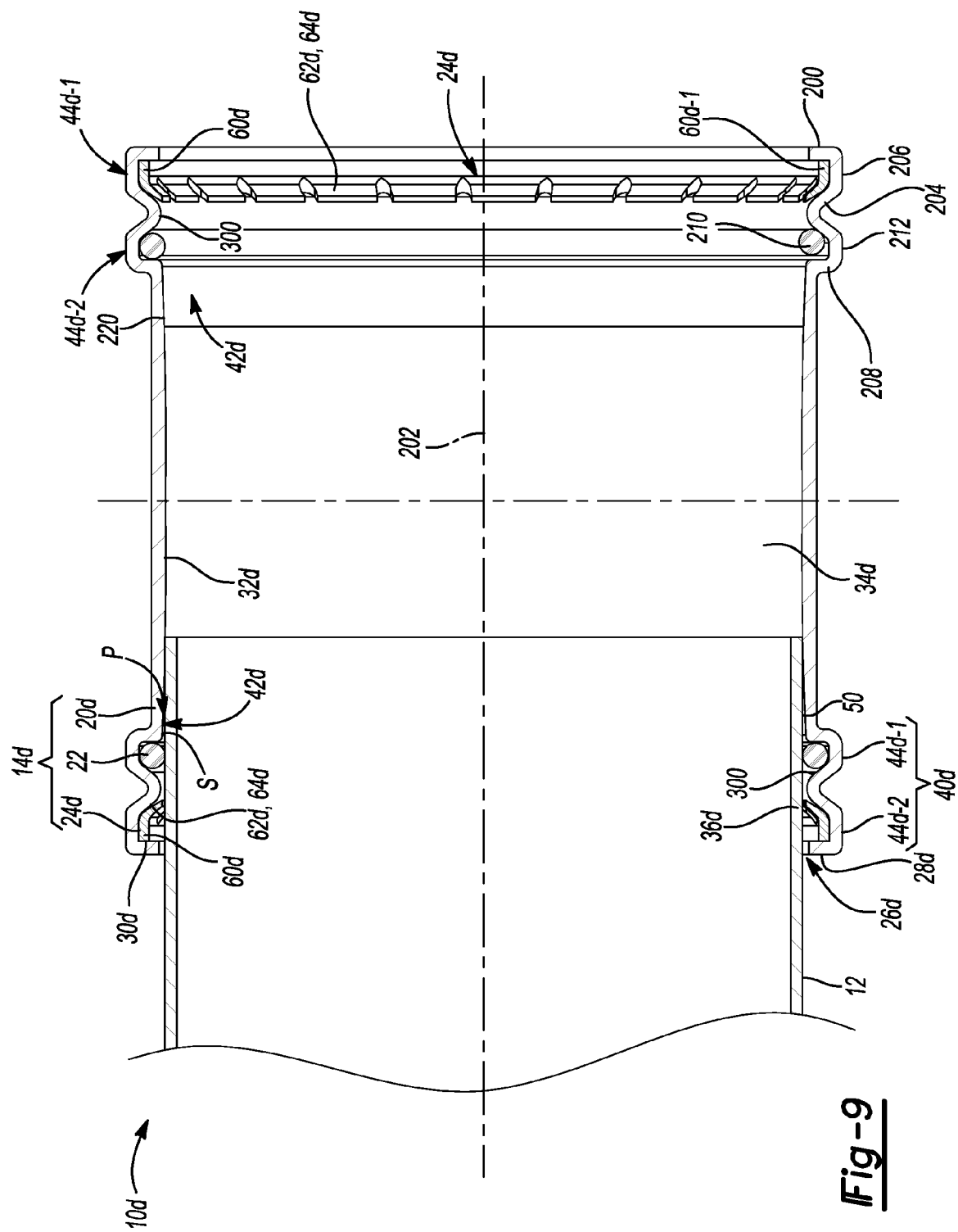
FIG. 9 is a longitudinal cross-sectional view of the portion of the assembly of FIG. 8.

With reference to FIGS. 8 and 9, a portion of a fifth assembly constructed in accordance with the teachings of the present disclosure is generally indicated by reference numeral 10d. The assembly 10d can comprise a structure 12 and a fitting 14d. The fitting 14d can include a body 20d, a seal element 22, and a grip ring 24d.

The body 20d can be made from any structural but ductile material, such as copper, brass, bronze, stainless steel or another metal. In the example provided, the body 20d is made of a copper alloy so as to eliminate the potential for a galvanic reaction with the copper alloy of the structure 12. The body 20d can include a hollow insertion end 26d that can have an end face 28d, an abutting wall 30d and an interior surface 32d. A cavity 34d defined by insertion end 26d can be configured to receive an associated end 36d of the structure 12.

Optionally, the body 20d can include a mount 40d and a stop 42d. The mount 40d can be configured to hold and position the seal element 22 and/or the grip ring 24d, while the stop 42d can be a feature that inhibits the insertion of the structure 12 into the cavity 34d beyond a predetermined distance. For example, the mount 40d can define a pair of annular cavities 44d-1, 44d-2. The annular cavity 44d-1 can be defined by a first wall member 200, which can be disposed generally perpendicular to the longitudinal axis 202 of the body 20d, a second wall member 204 that can be generally V-shaped in cross-section, and a third wall member 206 that can extend axially between the first and second wall members 200, 204. If desired, the first wall member 200 and/or the second wall member 204 can extend radially inwardly to an extent where it/they can aid in supporting the end 36d of the structure 12 (e.g., to help align the structure 12 to the longitudinal axis 202). The annular cavity 44d-2 can be defined by the second wall member 204, a fourth wall member 208, which can have a concave inner surface 210, and a fifth wall member 212 that can extend axially between and connect the second wall member 204 to the fifth wall member 212. As another example, the stop 42d can comprise a frusto-conical zone 220 on the interior surface 32d that can align the structure 12 to the longitudinal axis 202, as well as to inhibit insertion of the end 36d of the structure 12 into the interior cavity 34d beyond a predetermined dimension.

The grip ring 24d can be configured to permit the end 36d of the structure 12 to be inserted into the insertion end 26d but to resist withdrawal of the end 36d of the structure 12 from the insertion end 26d. The grip ring 24d can have a ring body 60d and a plurality of gripping elements 62d that can be coupled to the ring body 60d. In the particular example provided, the ring body 60d defines a circumferentially extending structure that is abutted against the abutting wall 30d, while the gripping elements 62d comprise circumferentially spaced-apart teeth 64d that are resiliently coupled to a proximal end 60d-1 of the ring body 60d. The teeth 64d can extend from the ring body 60d in direction that is radially-inward and axially away from the proximal end 60d-1 of the ring body 60d. The grip ring 24d can be received in the cavity 34d in the insertion end 26d and can be coupled to the body 20d in a manner that limits movement of the grip ring 24d in an axial direction relative to the body 20d (e.g., such that movement of the grip ring 24d in a direction that would withdraw the grip ring 24d from the insertion end 26d causes the grip ring 24d to contact the abutting wall 30d). In the example provided, the grip ring 24d is received in the annular cavity 44d-1 in the mount 40d such that grip ring 24d abuts the first wall member 200 and is at least partly supported by the second wall member 204 (e.g., the teeth 64d lie along a portion of a side of the second wall member 204) to thereby limit axial movement of the grip ring 24d. The grip ring 24d can have open ends (not shown), which permits the grip ring 24d to be inserted into the annular cavity 44d-1 after the body 20d of the fitting 14d has been formed. It will be appreciated, however, that the grip ring 24d could be formed in an endless manner and that in such case, it may be desirable to install the grip ring 24d into the fitting 14d prior to the formation of the first wall member 200.

The fitting 14d can be coupled to the structure 12 by inserting the end 36d of the structure 12 into the insertion end 26d and forcing the end 36d axially through the grip ring 24d and the seal element 22. The seal element 22 may be configured such that it does not sealingly engage one or both of the interior surface 32d of the insertion end 26d and the exterior surface 50 of the end 36d of the structure 12. In the particular example provided, however, the seal element 22 sealingly engages both the interior surface 32d of the insertion end 26d and the exterior surface 50 of the end 36d of the structure 12 when the end 36d of the structure 12 is inserted through the seal element 22. It will be appreciated that the grip ring 24d is configured to inhibit axial withdrawal of the end 36d of the structure 12 from the insertion end 26d. A commercially-available crimping tool (not shown), such as CT400 crimp tool marketed by Rigid or an M20+ crimp tool marketed by Stanley Bostitch, can be employed to deform the insertion end 26d of the fitting 14d to substantially permanently couple the fitting 14d to the structure 12d. Additionally or alternatively, insertion end 26d of the fitting 14d could be deformed by the commercially available crimping tool to create or improve sealing engagement of the seal element 22 with the interior surface 32d of the insertion end 26 and/or the exterior surface 50d of the end 36d of the structure 12.

It will be appreciated that this configuration provides a leak path P where pressurized fluid may leak in a space S between the end 36d of the structure 12 and the mount 40d and can urge the seal element 22 against both a sloped frusto-conical surface 300 of the second wall member 204 and the exterior surface of the structure 12. Movement of the seal element 22 in this manner drives the seal element 22 in an axial direction (i.e., axially outwardly of the insertion end 26d) so that it is further compressed between sloped frusto-conical surface 300 and the exterior surface of the structure 12 to provide improved sealing.

With reference to FIGS. 10 and 13-15, another component or structure 412 and fitting 414 are provided. The fitting 414 can couple two structures 412 to each other for sealed, fluid communication between the two structures 412. The structures 412 and fitting 414 can be incorporated into the assembly 10 (FIG. 1), for example.

As described above, the assembly 10 may communicate (i.e., supply, deliver, route) a fluid, such as a gas or liquid and as such, the structures 412 may be lengths of tubing. More particularly, the structures 412 in the particular embodiment illustrated may be lengths of drawn (full hard) copper tubing that are suitable for use in a system for the transmission of potable water. It will be appreciated, however, that the teachings of the present disclosure have broader applicability and as such, the scope of the present disclosure (and appended claims) is not limited to the particular application described and illustrated herein but rather extends to any joint wherein the components of the joint are fixedly and sealingly joined in the manner disclosed herein. In this regard, it will be appreciated that the structures 412 need not be tubular structures but rather could be any structure, such as a shaft, that sufficiently corresponds in size and shape to the fitting 414 so that a sealed or fluid-tight joint or connection may be formed therebetween.

Figure 10:
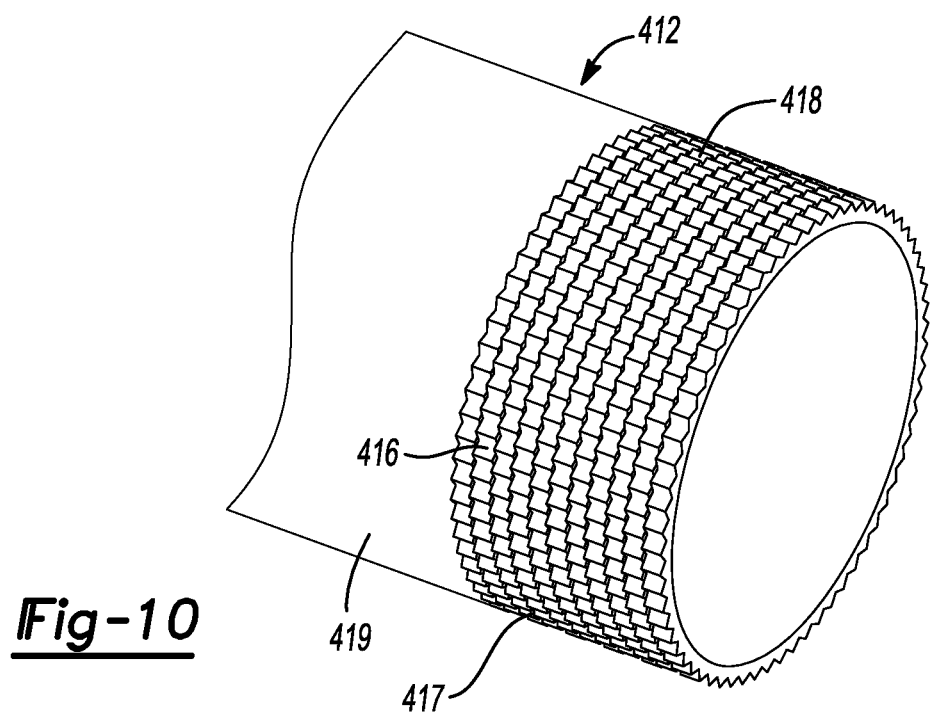
FIG. 10 is a partial perspective view of a pipe having a knurled end portion according to the principles of the present disclosure.
Figure 15:
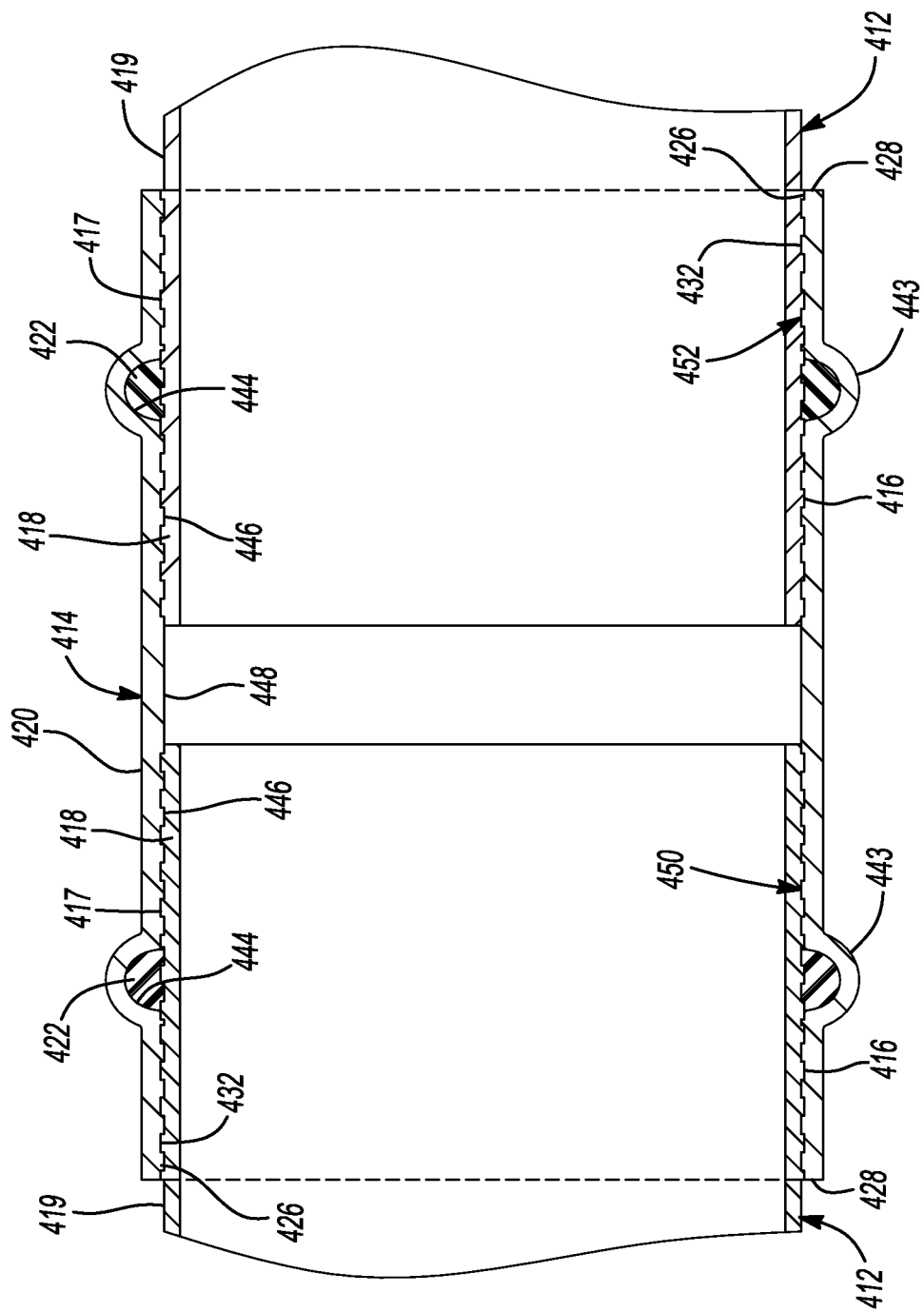
FIG. 15 is a cross-sectional view of a pair of pipes engaging the fitting according to the principles of the present disclosure.

As shown in FIGS. 10 and 15, each of the structures 412 can include a plurality of knurls 416 formed on an outer diametrical surface 417 of one or both end portions 418 of the structures 412. It will be appreciated that end portions 418 of the structures 412 could include dimples, ridges, teeth, bumps and/or other gripping or engagement features in the alternative to or in addition to the knurls 416.

Figure 11:
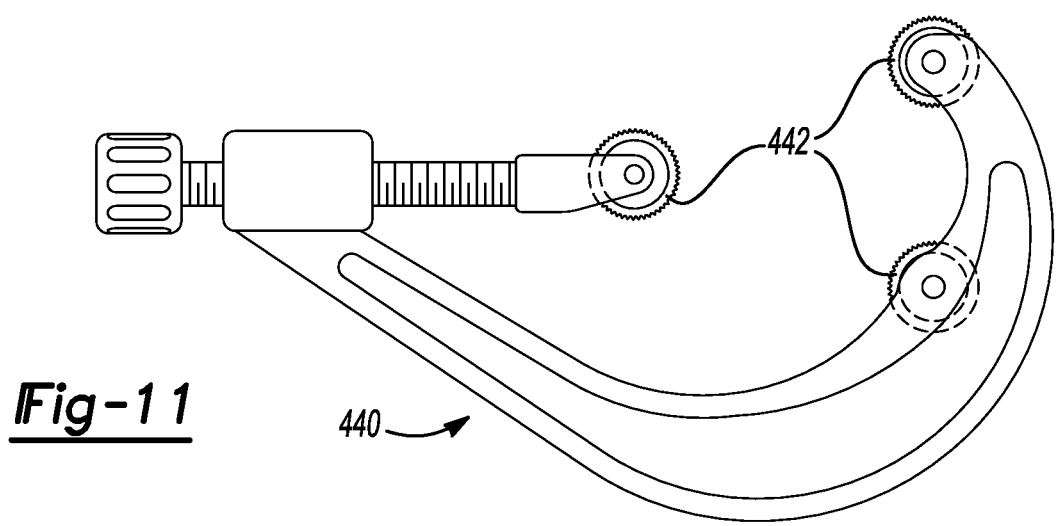
FIG. 11 is a side view of an exemplary tool for forming knurls in the pipe of FIG. 10.
Figure 12:
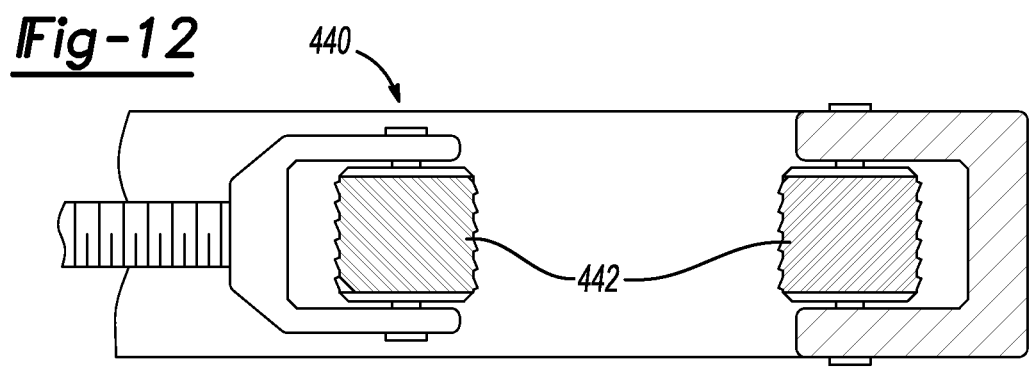
FIG. 12 is a partial cross-sectional view of the tool of FIG. 11.

A suitable tool 440 for forming the knurls 416 is illustrated in FIGS. 11 and 12. The tool 440 can include a plurality of knurling wheels 442 that can be moved relative to one another to drive the knurling wheels 442 into the structure 412. It will be appreciated that other wheels and/or other tools may be employed to form the knurls and/or other features on the structures 412.

In some embodiments, the knurls 416 and/or other gripping or engagement features on the end portions 418 may be raised relative to the rest of the outer diametrical surface 417 of the structure 412. That is, the knurls and/or other gripping or engagement features may define a slightly larger outer diameter than an outer diameter of an intermediate portion 419 (between opposing end portions 418) of the structure 412. In other embodiments, the outer diameter of the knurled end portions 418 may be approximately equal to the non-knurled intermediate portion 419.

Figure 13:
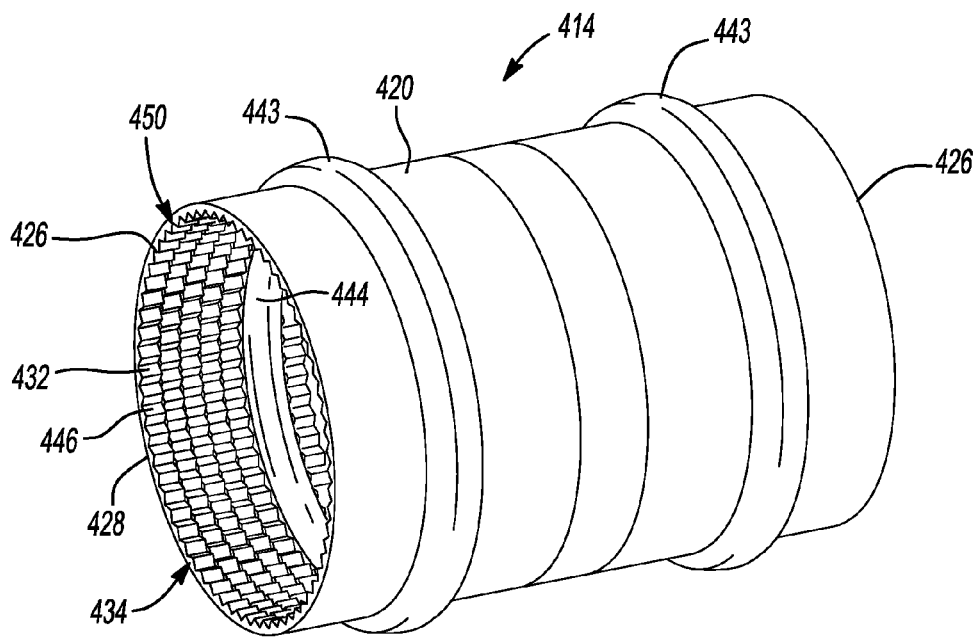
FIG. 13 is a perspective view of a fitting according to the principles of the present disclosure.
Figure 14:
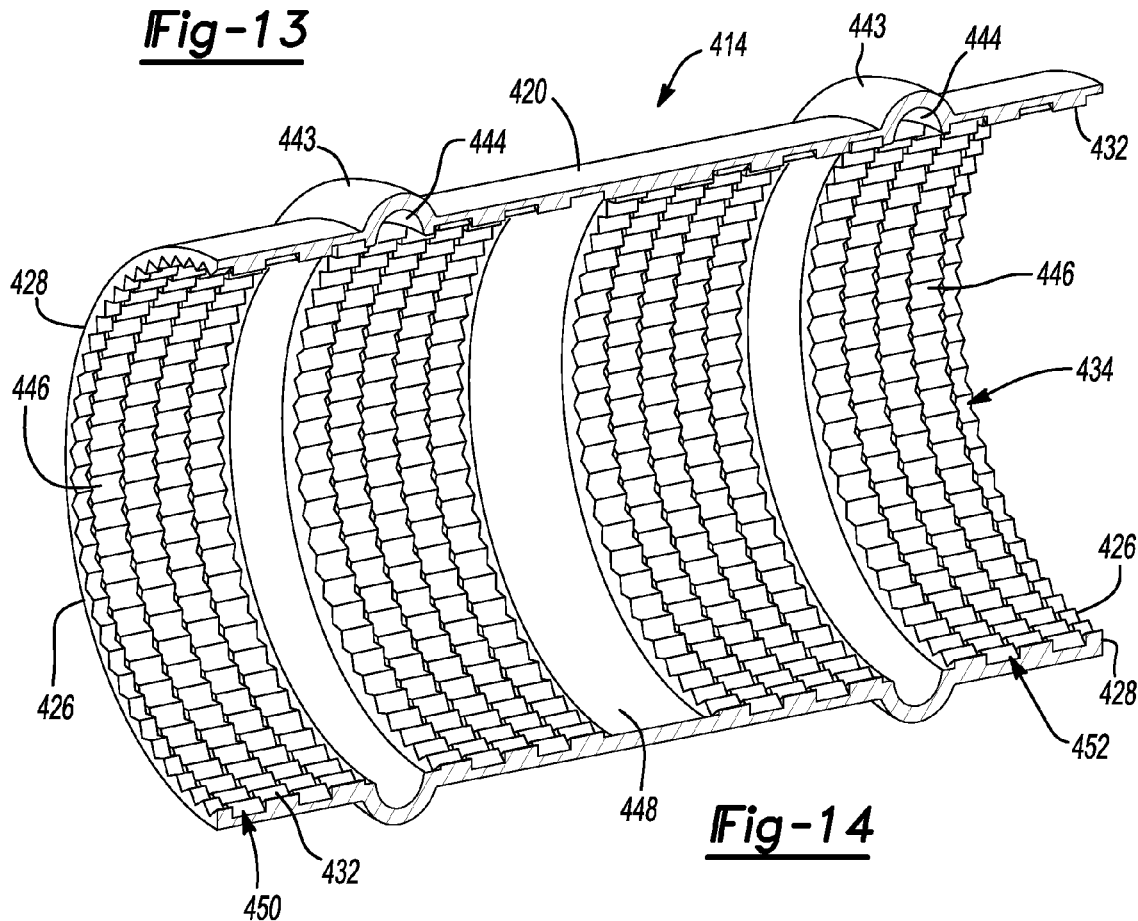
FIG. 14 is a cross-sectional view of the fitting of FIG. 13.

As shown in FIGS. 13-15, the fitting 414 can include a body 420 and a plurality of seal elements 422. It will be appreciated that although the particular fitting 414 depicted in FIGS. 13-15 is a straight union, the teachings of the present disclosure have applicability to various other types of fittings, including elbows, tees, caps, adapters, reducers, and bushings, for example.

The body 420 can be made from any structural but ductile material, such as copper, brass, bronze, stainless steel or another metal. In the example provided, the body 420 is made of a copper alloy so as to eliminate the potential for a galvanic reaction with the copper alloy of the structure 412. The body 420 can include a hollow insertion ends 426 that can have end faces 428, and an interior surface 432. A cavity 434 defined by insertion ends 426 can be configured to receive end portions 418 of the structures 412. While not shown in the figures, the body 420 could include a stop (similar to the stop 42 described above, for example) to inhibit insertion of the structures 412 into the cavity 434 beyond a predetermined distance. The body 420 could also include one or more annular protuberances 443 that define annular cavities 444.

The seal elements 422 can be any type of O-ring or seal that is configured to sealingly engage the interior surface 432 of the fitting 414 and an outer diametrical surface 417 of the end portions 418 of the structures 412. In the particular example provided, the seal elements 422 are received in the annular cavities 444 and are sized to sealingly engage the surfaces 417, 432 upon insertion of the end portions 418 of the structures 412 into the corresponding insertion ends 426 of the body 420 and through the seal elements 422.

Some or all of the interior surface 432 of the body 420 may include a plurality of knurls 446 and/or dimples, ridges, teeth, bumps and/or other gripping or engagement features. In the particular embodiment illustrated, the interior surface may include a non-knurled or smooth-bored portion 448 at a central portion of the body 420 and first and second knurled portions 450, 452 on corresponding sides of the smooth-bored portion 448. The annular cavities 444 may or may not include knurls 446.

In some embodiments, the knurls 446 and/or other gripping or engagement features of the knurled portions 450, 452 may protrude radially inward relative to the smooth-bored portion 448. In other embodiments, the inner diameters of the knurled portions 450, 452 may be approximately equal to the inner diameter of the smooth-bored portion 448.

As shown in FIG. 15, the fitting 414 may engage two structures 412 to form a secure, fluid-tight engagement therebetween. To engage the structures 412 with the fitting 414, each structure 412 may be inserted into a corresponding insertion end 426 of the body 420. The outer diameters of the structures 412 and inner diameters of the knurled portions 450, 452 of the fitting 414 may be sized relative to each other such that one of the end portions 418 of each of the structures 412 can be inserted or pressed into corresponding insertion ends 426.

In some embodiments, an interference fit may secure the structures 412 relative to the fitting 414. That is, after inserting or pressing the end portions 418 into the corresponding insertion ends 426, a tool (not shown) may be used to compress, crimp or otherwise deform the body 420 of the fitting 414 radially inward to more securely engage the knurled portions 450, 452 of the fitting 414 with the knurls 416 of the end portions 418 of the structures 412. In some embodiments, this crimping, compressing or deforming may cause slight radially inward compression or deformation of the end portions 418 of the structures 412 (i.e., causing a slight reduction of the inner diameters of the end portions 418). The reduction of the inner diameters of the end portions 418 may be so slight that there may be little or no appreciable restriction or impediment to fluid flow through the structures 412 and fitting 414 that is attributable to the diameter reduction. The tool used to crimp, compress and/or deform the fitting 414 and/or end portions 418 could, for example, be of the type described in Assignee's commonly owned U.S. Pat. No. 7,516,990, the disclosure of which is hereby incorporated by reference.

The press-fit and/or interference-fit engagement of the structures 412 and fitting 414 described above may cause the knurls 416 of the structures 412 to securely engage and/or mesh with the knurls 446 of the corresponding knurled portion 450, 452 of the fitting 414. In this manner, the knurls may cooperate to provide engagement between the fitting 414 and the structures 412 that is secure enough that adhesive, brazing, soldering, welding, clamping, or other fastening means or devices may not be necessary. In the particular embodiment illustrated in FIG. 15, no adhesive or other fastening device or means securing the structures 412 to the fitting 414 is included.

In other embodiments, the end portions 418 and insertion ends 426 may be sized relative to each other such that the end portions 418 may be pressed into the insertion ends 426 to create a sufficiently secure connection therebetween that crimping, compressing and/or deforming the fitting 414 and structures 412 may not be necessary.

The methods of engaging the structures 412 and the fitting 414 described above may be especially desirable and advantageous when the structures 412 are relatively small diameter pipes. For example, in certain applications, it may be difficult and/or expensive to manufacture grip rings that effectively and reliably engage pipes having approximately two-inch diameters and smaller. It will be appreciated that the principles of the present disclosure are applicable to pipes and fittings of any size.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly comprising:
a fitting including an annular body having a first insertion end and an inner diametrical surface having a first knurled portion disposed adjacent the first insertion end;
a first pipe having a first end portion that is received into the first insertion end of the body and an outer diametrical surface including knurls formed thereon, the knurls of the outer diametrical surface engaging the first knurled portion of the fitting; and
a first seal element disposed within the fitting and sealingly engaged to the first pipe and the fitting body,
wherein engagement between the inner diametrical surface of the fitting and the outer diametrical surface of the pipe includes one of a press fit and an interference fit.

2. The assembly of claim 1, wherein the body of the fitting includes a second insertion end and the inner diametrical surface includes a second knurled portion disposed adjacent the second insertion end.

3. The assembly of claim 2, further comprising a second pipe having a second end portion that is received into the second insertion end of the fitting body and an outer diametrical surface including knurls formed thereon, the knurls of the second pipe engaging the second knurled portion of the fitting.

4. The assembly of claim 3, wherein the inner diametrical surface of the fitting includes a non-knurled portion disposed between the first and second knurled portions.

5. The assembly of claim 1, wherein the engagement between the fitting and the first pipe is free from adhesive.

6. The assembly of claim 1, wherein one or both of the fitting and the first pipe are deformed radially inward to form the interference fit between the fitting and the structure.

7. The assembly of claim 1, wherein the seal element surrounds the outer diametrical surface of the structure.

8. The assembly of claim 7, wherein the seal element is received in an annular cavity that extends radially outward relative to the inner diametrical surface.

\* \* \* \* \*